United States Patent
Chang et al.

(10) Patent No.: US 8,909,979 B2
(45) Date of Patent: Dec. 9, 2014

(54) METHOD AND SYSTEM FOR IMPLEMENTING INTERCONNECTION FAULT TOLERANCE BETWEEN CPU

(71) Applicant: Huawei Technologies Co., Ltd., Shenzhen (CN)

(72) Inventors: Sheng Chang, Hangzhou (CN); Haibin Wang, Hangzhou (CN); Jie Zhang, Shenzhen (CN); Rongyu Yang, Hangzhou (CN); Xinyu Hou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 258 days.

(21) Appl. No.: 13/707,188

(22) Filed: Dec. 6, 2012

(65) Prior Publication Data

US 2013/0097455 A1     Apr. 18, 2013

Related U.S. Application Data

(63) Continuation of application No. PCT/CN2011/076471, filed on Jun. 28, 2011, which is a continuation-in-part of application No. PCT/CN2011/076430, filed on Jun. 27, 2011.

(51) Int. Cl.
*G06F 11/00* (2006.01)
*G06F 11/20* (2006.01)
*G06F 11/07* (2006.01)
*G06F 11/14* (2006.01)

(52) U.S. Cl.
CPC ........ *G06F 11/2005* (2013.01); *G06F 11/0784* (2013.01); *G06F 11/1443* (2013.01); *G06F 11/0724* (2013.01); *G06F 11/0745* (2013.01)
USPC .............................................. 714/4.5; 714/43

(58) Field of Classification Search
CPC ......................... G06F 11/2002; G06F 11/2007
USPC ..................................................... 714/4.5, 43
See application file for complete search history.

(56) References Cited

U.S. PATENT DOCUMENTS

| | | | |
|---|---|---|---|
| 8,719,843 B2 * | 5/2014 | Tamir et al. | 719/314 |
| 2008/0005596 A1 * | 1/2008 | Sistla et al. | 713/300 |

(Continued)

FOREIGN PATENT DOCUMENTS

| | | |
|---|---|---|
| CN | 101634959 A | 1/2010 |
| CN | 101752288 A | 6/2010 |

(Continued)

OTHER PUBLICATIONS

Search Report issued in corresponding Chinese Patent Application No. 201180001259.2, dated Mar. 27, 2013, 6 pages.

(Continued)

*Primary Examiner* — Philip Guyton
(74) *Attorney, Agent, or Firm* — Huawei Technologies Co., Ltd.

(57) ABSTRACT

A system for implementing interconnection fault tolerance between CPUs, a first CPU and a second CPU implements interconnection through a first CPU interconnect device and a second CPU interconnect device. The system adds a data channel between a first SerDes interface of the first CPU interconnect device and a second SerDes interface of the second CPU interconnect device, and transmits link connection state information and a link control signal through the added data channel. The system monitors a link state of any one link in a CPU interconnection system, transmits the link state through the added data channel, recovers any one of the connection links when determining whether any one of the first connection link, the second connection link and the third connection link is faulty.

14 Claims, 3 Drawing Sheets

(56) References Cited

U.S. PATENT DOCUMENTS

| | | | |
|---|---|---|---|
| 2008/0071961 A1 | 3/2008 | Higuchi et al. | |
| 2009/0083518 A1 | 3/2009 | Glew | |
| 2011/0029734 A1* | 2/2011 | Pope et al. | 711/118 |
| 2013/0097455 A1* | 4/2013 | Chang et al. | 714/3 |
| 2013/0103875 A1* | 4/2013 | Chang et al. | 710/310 |

FOREIGN PATENT DOCUMENTS

| | | |
|---|---|---|
| CN | 101753388 A | 6/2010 |
| CN | 101819556 A | 9/2010 |
| CN | 101833491 A | 9/2010 |
| CN | 101908036 A | 12/2010 |
| CN | 101930422 A | 12/2010 |
| WO | WO 2011/053330 A1 | 5/2011 |

OTHER PUBLICATIONS

International Search Report issued in corresponding PCT Patent Application No. PCT/CN2011/076430, mailed Mar. 29, 2012.
International Search Report issued in corresponding PCT Patent Application No. PCT/CN2011/076471, mailed Jan. 5, 2012.
Search Report issued in corresponding Chinese Patent Application No. 201180000979.7, dated Aug. 3, 2012.
Search Report issued in corresponding Chinese Patent Application No. 2011800009797, dated Jul. 25, 2012.
Office Action issued in corresponding Chinese Patent Application No. 201180001259.2, mailed May 15, 2013, 7 pages.

* cited by examiner

METHOD AND SYSTEM FOR IMPLEMENTING INTERCONNECTION FAULT TOLERANCE BETWEEN CPU

CROSS-REFERENCE TO RELATED APPLICATIONS

This application is a continuation of International Application No. PCT/CN2011/076471, filed on Jun. 28, 2011, and a continuation part of International Application No. PCT/CN2011/076430, filed on Jun. 27, 2011, which are hereby incorporated by reference in their entirety.

FIELD

The present disclosure relates to the field of communications technologies, and in particular, to a method and a system for implementing interconnection fault tolerance between CPUs.

BACKGROUND

Two solutions for implementing interconnection between CPUs are as follows.

One implementation solution is interconnection between CPUs that is implemented by the IBM Corporation in a PCB (Printed Circuit Board, printed circuit board) full direct connection manner. Each Power CPU of IBM has 7 high-speed interconnection interfaces, which may be interconnected with 7 Power CPUs at the same time. The 8 Power CPUs may form an 8P system through the full direct connection manner. However, as the Power CPU integrates a function of a NC (node controller), the cost is high. Limited by the number of the interconnection interfaces of the Power CPU, the expansibility of a CPU system that is formed by the Power CPUs is poor, and the flexibility is low.

Another implementation solution is interconnection between CPUs that is implemented by the HP Company by employing a NC node controller and a switch module, and a system of the whole interconnection architecture is complex. In this solution, 2 chips are added in the whole system, which respectively implement NC node control and a switch module function. In this the solution, the switch module is employed to perform an exchange of data between NCs, and each switch module needs to perform jump point judgment, so a delay in data transmission is increased, the system performance is relatively low, and the cost is relatively high.

Therefore, for a current CPU interconnection solution, the expansibility is poor, the delay in data transmission is relatively long, and the system performance is low; in addition, in each link for implementing CPU interconnection, if any link is erroneous, abnormity of the interconnection between the involved CPUs may be caused, and a related solution for interconnection fault tolerance between the CPUs does not exist.

SUMMARY

To solve the foregoing technical problem existing in the prior art, the present disclosure proposes a method and a system for implementing interconnection fault tolerance between CPUs, capable of improving the expansibility of interconnection between the CPUs, and implementing interconnection fault tolerance between the CPUs.

Technical solutions of the present disclosure are as follows.

An embodiment of the present disclosure provides a method for implementing fault tolerance in a system, wherein the system comprises a first CPU, a second CPU, a first CPU interconnect device, and a second CPU interconnect device, the first CPU interconnect device comprises a first quick path interconnect (QPI) interface and a first serial deserial (SerDes) interface that are connected to each other, the second CPU interconnect device comprises a second QPI interface and a second SerDes interface that are connected to each other;

the first CPU and the second CPU implements interconnection through a first connection link, a second connection link and a third connection link;

the first connection link is established between a QPI interface of the first CPU and the first QPI interface to transmit data sent or received by the first CPU;

the third connection link is established between a QPI interface of the second CPU and the second QPI interface to transmit data sent or received by the second CPU;

the second connection link is established between the first SerDes interface and the second SerDes interface to transmit data between the first CPU and the second CPU;

wherein a fourth data channel is additionally established between the first SerDes interface and the second SerDes interface, the fourth data channel is configured to transmit link state and a link control signal, the method comprises:

monitoring link state of any one of the first connection link, the second connection link and the third connection link;

transmitting link state through the fourth data channel between the first CPU interconnect device and the second CPU interconnect device; and recover any faulty connection links when determining any one of the first connection link, the second connection link and the third connection link faulty.

A system for implementing fault tolerance, including:

a first CPU, a second CPU, a first CPU interconnect device, and a second CPU interconnect device, the first CPU interconnect device comprises a first quick path interconnect (QPI) interface and a first serial deserial (SerDes) interface that are connected to each other, the second CPU interconnect device comprises a second QPI interface and a second SerDes interface that are connected to each other;

the first CPU and the second CPU implements interconnection through a first connection link, a second connection link and a third connection link;

the first connection link is established between a QPI interface of the first CPU and the first QPI interface to transmit data sent or received by the first CPU;

the third connection link is established between a QPI interface of the second CPU and the second QPI interface to transmit data sent or received by the second CPU;

the second connection link is established between the first SerDes interface and the second SerDes interface to transmit data between the first CPU and the second CPU;

wherein a fourth data channel is additionally established between the first SerDes interface and the second SerDes interface, the fourth data channel is configured to transmit link state and a link control signal;

the system is configured to monitor link state of any one of the first connection link, the second connection link and the third connection link, transmit link state through the fourth data channel between the first CPU interconnect device and the second CPU interconnect device, recover any one of connection links when determining any one of the first connection link, the second connection link and the third connection link faulty.

When any connection link for implementing interconnection between the first CPU and the second CPU is faulty, the FPGA connected to the faulty link sends a link control signal to the faulty link through the data channel added in the FPGA, so as to restore the faulty link to a normal state; and when the faulty link is restored to the normal state, each FPGA respectively enables each link in the normal state connected to each FPGA, so as to connect each link for implementing interconnection between the first CPU and the second CPU.

In the embodiments of the present disclosure, the FPGA is disposed for the CPU, and based on a transparent transmission function of the FPGA, interconnection between the CPUs is implemented through a connection between the FPGAs, so increase and decrease of the number of the CPUs interconnected internally may be implemented by increasing or decreasing the number of dedicated FPGAs. Therefore, the expansibility of the interconnection between the CPUs can be improved; and moreover, the data channel is added in the FPGA. When any connection link between the interconnected CPUs is faulty, the connection state information of each interconnected link of the CPUs and the link control signal are transmitted through the data channel, so as to implement the interconnection fault tolerance between the CPUs.

BRIEF DESCRIPTION

DETAILED DESCRIPTION

The technical solutions in the embodiments of the present disclosure will be clearly and completely described in the following with reference to the accompanying drawings in the embodiments of the present disclosure. It is obvious that the embodiments to be described are only part rather than all of the embodiments of the present disclosure. All other embodiments obtained by persons of ordinary skill in the art based on the embodiments of the present disclosure without creative effects shall fall within the protection scope of the present disclosure.

Figure 1A:
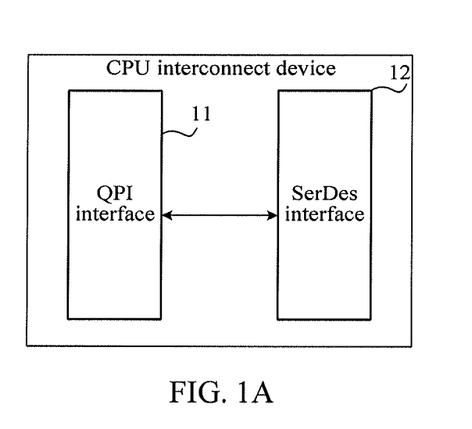
FIG. 1A is a schematic structural diagram of a CPU interconnect device according to an embodiment.

FIG. 1A is a schematic structural diagram of a CPU interconnect device according to an embodiment of the present disclosure. The CPU interconnect device in the embodiment of the present disclosure may be implemented through the field programmable gate array (Field Programmable Gate Array, FPGA). As shown in FIG. 1A, this embodiment includes a QPI (Quick Path Interconnect, quick path interconnect) interface module 11 and a SerDes interface module 12.

The QPI interface module 11 is connected to a QPI interface of a CPU. The SerDes interface module 12 is connected to the QPI interface module 11 and another SerDes interface module, where another SerDes interface module is located on another CPU interconnect device used for interconnection among CPUs.

The QPI interface module 11 is configured to convert serial QPI data sent from the CPU into parallel QPI data. The QPI interface module converts the serial QPI data sent from the CPU into the parallel QPI data, so that the frequency of the QPI data is reduced, so as to adapt to a data processing frequency inside the CPU interconnect device.

The SerDes interface module 12 is configured to convert the parallel QPI data received from the QPI interface module into high-speed serial SerDes data, and send the high-speed serial SerDes data to another SerDes interface module. Since the SerDes interface module converts QPI data interface with the DC characteristic that does not support long-distance cable interconnection and topology into a SerDes interface with an AC characteristic, long-distance high-speed cable interconnection and topology are supported, thereby implementing high-speed interconnection among inter-board processors.

The SerDes interface module 12 is further configured to receive high-speed serial SerDes data sent from another SerDes interface module, and convert the received high-speed serial SerDes data into parallel QPI data. The QPI interface module 11 is further configured to convert the parallel QPI data sent from the SerDes interface module into serial QPI data and then send the serial QPI data to the connected CPU.

Furthermore, the bandwidth of a channel between the QPI interface module 11 and the SerDes interface module 12 is greater than the bandwidth of a QPI channel, thereby avoiding QPI packet loss due to overflow of the channel for transparent transmission.

Figure 1B:
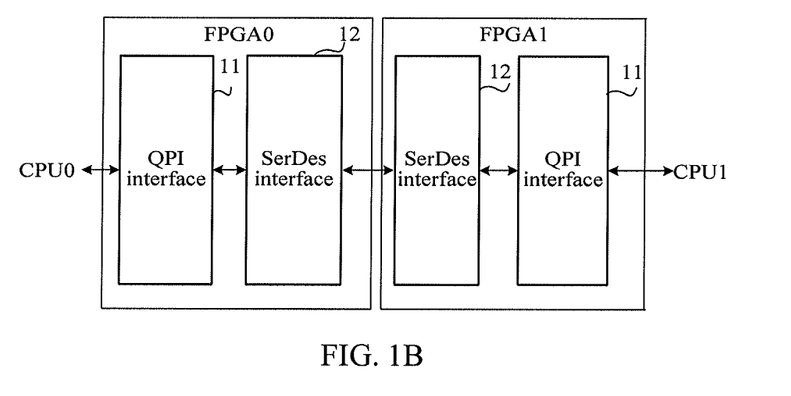
FIG. 1B is a schematic diagram illustrating the interconnection among inter-board CPUs implemented through the CPU interconnect device shown in FIG. 1A.

FIG. 1B is a schematic diagram illustrating the interconnection among inter-board CPUs through the CPU interconnect device shown in FIG. 1A. As shown in FIG. 1B, when the CPU interconnect device in FIG. 1A is implemented by using the FPGA, the interconnection among CPU0 and CPU1 is implemented through two CPU interconnect devices (FPGA0 and FPGA1) implemented by using the FPGA. The QPI interface module 11 on FPGA0 is connected to a QPI interface of CPU0, and the SerDes interface module 12 on FPGA0 is connected to a SerDes interface module on FPGA1. A QPI interface module on FPGA1 is connected to a QPI interface of another CPU1. A manner of transmitting data from CPU0 to CPU1 by FPGA0 and FPGA1 is described in the following. Data from CPU1 is transmitted to CPU0 in a similar manner.

CPU0 sends 4.8 Gbp/s high-speed serial QPI data to the QPI interface module 11 through 20 QPI channels at the same time, and after receiving the high-speed serial QPI data, the QPI interface module 11 converts the 20-bit serial QPI data into 640-bit parallel QPI data, and sends the 640-bit parallel QPI data to the SerDes interface module 12. After the SerDes interface module 12 receives the 640-bit parallel QPI data, the SerDes interface module 12 first performs CDR encoding on the 640-bit parallel QPI data, and then converts it into high-speed serial SerDes data, and afterwards, sends the high-speed serial SerDes data to the SerDes interface module on FPGA1 through a high-speed cable (CXP). After receiving the high-speed serial SerDes data sent from the SerDes interface module on FPGA0, the SerDes interface module on FPGA1 re-converts the high-speed serial SerDes data into 640-bit parallel QPI data, and then sends the 640-bit parallel QPI data to the QPI interface module on FPGA1. The QPI interface module on FPGA1 converts the 640-bit parallel QPI data into 20-bit serial QPI data, and then sends the 20-bit serial QPI data to the connected CPU1 through the QPI channel.

SerDes is short for serializer and de-serializer. At a sending end, the SerDes interface module on FPGA0 converts multi-path low-speed 640-bit parallel QPI data into high-speed serial data signals, and then transmits the high-speed serial data signal to the SerDes interface module on FPGA1 through the high-speed cable. At a receiving end, the SerDes interface module on FPGA1 re-converts the high-speed serial data signal into low-speed 640-bit parallel QPI data. The SerDes interface module fully utilizes the channel capacity of transmission media, thereby reducing required transmission channels and device pin data, and decreasing a transmission cost. The SerDes interface module may adopt a bi-directional 6 Gbps 20 lane bound channel with effective bandwidth being 120 GB/s, where additionally added 1 lane is used for transmitting an out-of-band control signal between FPGAs.

In the CPU interconnect device according to the embodiment of the present disclosure, the QPI interface module is connected to one CPU, the SerDes interface module is connected to a SerDes interface module on another CPU interconnect device, and a QPI interface module on another CPU interconnect device is connected to another CPU. Therefore, two dedicated CPU interconnect devices provided by the embodiment of the present disclosure are capable of implementing the interconnection among two CPUs. Eight dedicated CPU interconnect devices may form a 4P system in which four CPUs are interconnected, and 16 dedicated CPU interconnect devices may form a 8P system in which eight CPUs are interconnected. Through the system formed by the dedicated CPU interconnect devices provided by the embodiment of the present disclosure, when the number of internally interconnected CPUs increases or decreases, the number of the dedicated CPU interconnect devices may be increased or decreased. Therefore, the system has high scalability and flexibility. Since two CPUs in the system are connected to each other through two dedicated CPU interconnect devices, the process of selecting a receiving CPU does not exist during data transmission between CPU interconnect devices, and two adjacent CPU interconnect devices are connected to each other through a SerDes interface module supporting long-distance high-speed transmission, thereby reducing data transmission delay between CPUs.

Figure 1C:
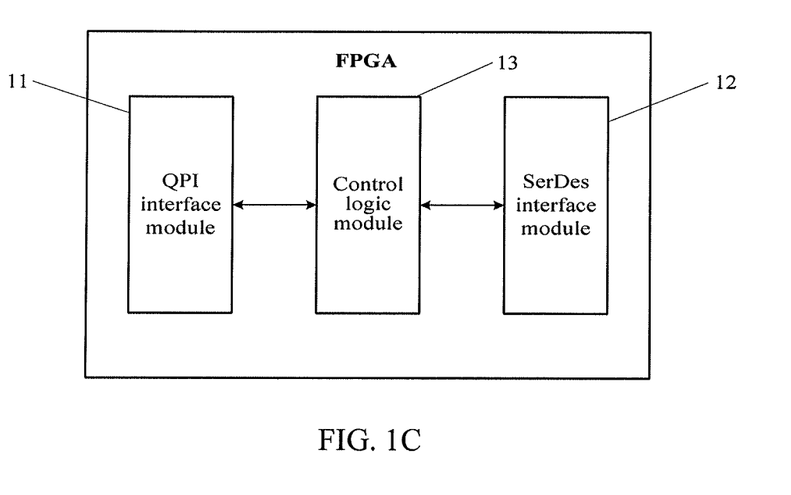
FIG. 1C is a schematic structural diagram of an FPGA for implementing interconnection between CPUs according to an embodiment of the present disclosure.

FIG. 1C is a schematic structural diagram of an FPGA for implementing interconnection between CPUs according to an embodiment of the present disclosure. First, referring to FIG. 1, the FPGA (Field-Programmable Gate Array, field-programmable gate array) is disposed with a QPI (Quick Path Interconnect, quick path interconnect) interface module 11 and a SerDes (Serial Deserial, serial deserial) interface module 12. The QPI interface module 11 of the FPGA is connected to a QPI interface of a CPU, and is responsible for completing high-speed data transmission between the FPGA and the CPU. A control logic module 13 is further disposed between the QPI interface module and the SerDes interface module, and the SerDes interface module 12 is connected to the control logic module 13, and is also connected, through a CXP cable (CXP Cable), to a SerDes interface module 12 that is disposed on another FPGA.

Figure 2:
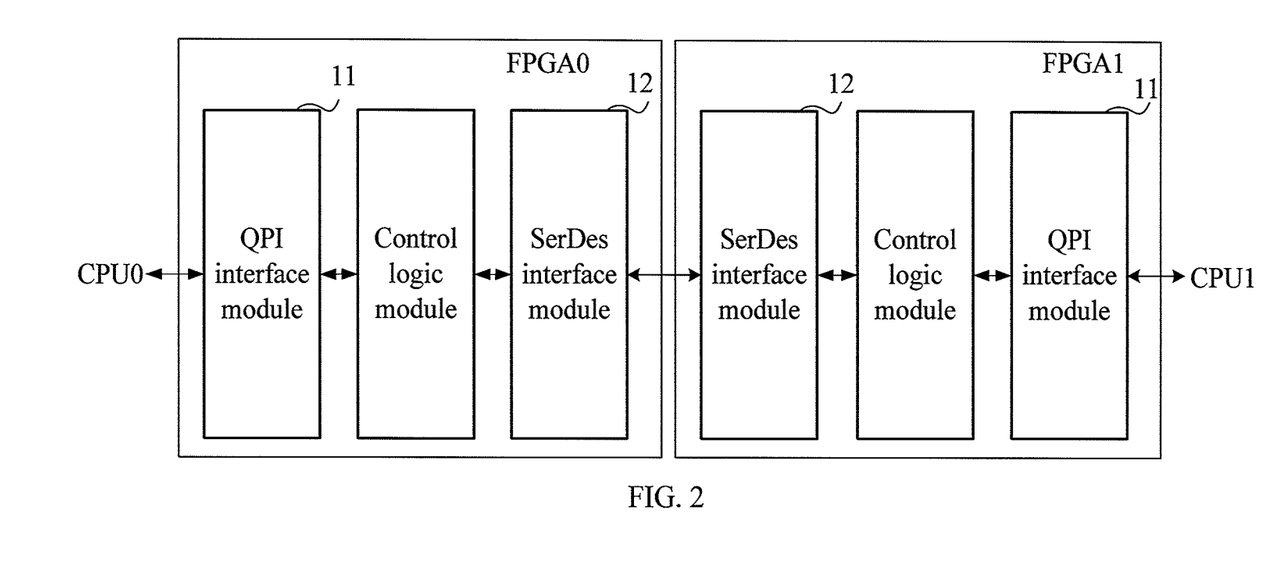
FIG. 2 is a schematic structural diagram of implementing CPU interconnection by using the FPGA in FIG. 1.

FIG. 2 is a schematic structural diagram of implementing CPU interconnection by using the FPGA.

For convenience of description, that two CPUs are interconnected is taken as an example for illustration, and the interconnected two CPUs are respectively named a first CPU (CPU 0) and a second CPU (CPU 1). The first CPU and the second CPU are respectively connected to an FPGA, namely, a first FPGA (FPGA 0) and a second FPGA (FPGA 1).

When each link interconnected between the first CPU and the second CPU is in a normal state, a QPI interface module 11 on the FPGA may convert serial QPI data that is sent by the CPU into parallel QPI data. Because the QPI interface module converts the serial QPI data that is sent by the CPU into the parallel QPI data, a frequency of the QPI data is reduced, to fit a data processing frequency inside the FPGA.

A SerDes interface module 12 on the FPGA may convert the parallel QPI data that is received from the QPI interface module 11 into high-speed serial SerDes data, send the high-speed serial SerDes data to the peer CPU through a SerDes interface module 12 that is disposed on another FPGA, receives high-speed serial SerDes data sent by the SerDes interface module that is on the peer FPGA, convert the received high-speed serial SerDes data into parallel QPI data, and send the parallel QPI data to the CPU connected to the FPGA.

The SerDes interface module converts QPI data of a DC characteristic that does not support long distance cable interconnection and topology into a SerDes interface of AC characteristic, so as to support long distance and high-speed cable interconnection and topology, thereby implementing high-speed interconnection of processors between boards. In the embodiment of the present disclosure, on the basis of an original data channel between the SerDes interfaces, at least one data channel is added, and different form the original data channel, the added data channel is not used for transmission of data between the interconnected CPUs, but is configured to transmit link state information of each interconnected link between the FPGAs and a link control signal to recover a faulty link.

In addition, in the FPGA, a control logic module is disposed between the QPI interface module and the SerDes interface module, and is configured to monitor a transmission link connection state between a peer FPGA and a corresponding CPU, and control a transmission link connection state between a local FPGA and a corresponding CPU.

For the interconnection architecture, an embodiment of the present disclosure provides an embodiment of a method for implementing interconnection fault tolerance between CPUs.

In specific implementation, the first CPU is connected to a first QPI interface module of the first FPGA (FPGA 0); the second CPU is connected to a second QPI interface module of the second FPGA (FPGA 1); a first SerDes interface module of the first FPGA is connected to a second SerDes interface module of the second FPGA, and is connected to the first QPI interface module through a first control logic module; and the second SerDes interface module of the second FPGA is connected to the second QPI interface module through a second control logic module, so as to implement the interconnection between the first CPU and the second CPU, where a first data channel for transmitting the link connection state information and a link control signal is added in the first SerDes interface module, and a second data channel for transmitting the link connection state information and a link control signal the is added in the second SerDes interface module; the control logic module between the corresponding QPI interface module and the SerDes interface module in the first FPGA and the second FPGA is configured to monitor the transmission link connection state between a peer FPGA and a corresponding CPU, and control the transmission link connection state between a local FPGA and a corresponding CPU.

Therefore, the interconnection architecture in the embodiments of the present disclosure involves a QPI link between the CPU 0 and the FPGA 0, a high-speed SerDes link between the FPGA 0 and the FPGA 1, and a QPI link between the FPGA 1 and the CPU 1. If any one of the 3 links is faulty, abnormity of interconnection between the CPU 0 and the CPU 1 is caused.

In the embodiment of the present disclosure, when any connection link for implementing interconnection between the first CPU and the second CPU is faulty, the FPGA connected to the faulty link sends a link control signal to the faulty link through the data channel added in the FPGA, so as to restore the faulty link to a normal state.

When the faulty link is restored to a normal state, each FPGA respectively enables each link in the normal state connected to each FPGA, so as to connect each link for implementing interconnection between the first CPU and the second CPU.

In the embodiment of the present disclosure, the FPGA is disposed for the CPU, and based on a transparent transmission function of the FPGA, interconnection between the CPUs is implemented through the connection between the FPGAs, so increase and decrease of the number of the CPUs interconnected internally may be implemented by increasing or decreasing the number of dedicated FPGAs. Therefore, the expansibility of the interconnection between the CPUs can be improved; and moreover, the data channel is added in the FPGA. When any connection link between the interconnected CPUs is faulty, the connection state information of each interconnected link of the CPUs and the link control signal are transmitted through the data channel, so as to implement the interconnection fault tolerance between the CPUs.

For convenience of full understanding of the technical solutions according to the embodiments of the present disclosure, the technical solutions in the embodiments of the present disclosure are clearly and completely described below with reference to the accompanying drawings in the embodiments of the present disclosure.

Figure 3:
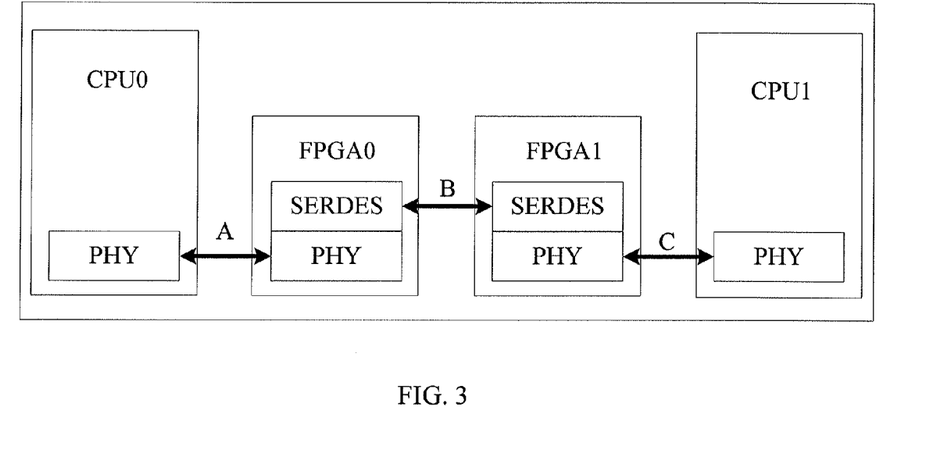
FIG. 3 is a schematic diagram of a link connection that is involved in interconnection architecture in FIG. 2.

As shown in FIG. 3, FIG. 3 is a schematic diagram of link connection that is involved in interconnection architecture according to an embodiment of the present disclosure. Corresponding links include: a QPI link (briefly referred to as a link A) between the CPU 0 and the FPGA 0, a high-speed SerDes link (briefly referred to as a link B) between the FPGA 0 and the FPGA 1, and a QPI link (briefly referred to as a link C) between the FPGA 1 and the CPU 1. A faulty state of abnormal working may exist on all of the links A, B, and C, and therefore, a fault tolerance solution in the embodiments of the present disclosure is solving the abnormal state that exists on any link of A, B, and C.

Embodiment 1

When the control logic module in the first FPGA or the second FPGA monitors that the link B between the first SerDes interface module and the second SerDes interface module is faulty, the control logic module in the first FPGA and the second FPGA sends a link control signal to the link B through respective data channel added, so as to restore the link B to a normal state.

At the same time, the first control logic module in the first FPGA controls, through the data channel added in the first SerDes interface module, the link A between the first QPI interface module and the first CPU to be maintained in a reset state, and the second control logic module in the second FPGA controls, through the data channel added in the second SerDes interface module, the link C between the second QPI interface module and the second CPU to be maintained in the reset state, so as to wait for successful establishment of the link B. When the link B is restored to be normal, the first control logic module controls connection of the link A through the data channel added in the first SerDes interface module; and at the same time, the second control logic module controls connection of the link C through the data channel added in the second SerDes interface module.

In specific implementation, after the link B is established successfully, the first FPGA controls a QPI initialization process of the link A, and at the same time, the second FPGA controls a QPI initialization process of the link C, thereby implementing connection of the links A and C.

After all of the links A, B, and C are established, normal link communication may be started between the first CPU and the second CPU, thereby completing the interconnection between the first CPU and the second CPU.

Embodiment 2

When the first control logic module monitors that the link A is faulty, and the second control logic module monitors that the link C is faulty, the first control logic module sends fault information of the link A to the second FPGA through the data channel added in the first SerDes interface module; and at the same time, the second control logic module sends fault information of the link C to the first FPGA through the data channel added in the second SerDes interface module, that is, the first FPGA and the second FPGA interact local QPI link state through respective data channels added.

The control logic module in one of the first FPGA and the second FPGA which first receives the fault information of the connection link sends a link control signal through the data channel added in the FPGA to the connection link connecting the corresponding CPU, so as to restore the connection link to a normal state; and sends a link control signal to the peer FPGA through the data channel added in the FPGA, so as to control the control logic module of the peer FPGA to initiate a restoration operation of the connection link that corresponds to the peer FPGA.

The first FPGA and the second FPGA exchange a link control operation signal mutually, so that the links A and C respectively enter an initialization process, thereby completing the reestablishment of the links A and C.

Embodiment 3

When the links A and B are faulty, and the link C is normal, the first control logic module can monitor the foregoing abnormal links, and control, through the data channel added in the first SerDes interface module, the link A to be maintained in a reset state; and at the same time, the second control logic module can monitor that the link B is abnormal, and the second control logic module controls, through the data channel added in the second SerDes interface module, the link C to be maintained in the reset state, to wait for the reestablishment of the link B.

In addition, the first control logic module and the second control logic module send a link control signal to the link B through respective data channels added, so as to restore the link B to a normal state. When the link B is restored to be normal, the first control logic module controls the connection of the link A through the data channel added in the first SerDes interface module, at the same time, the second control logic module controls the connection of the link C through the data channel added in the second SerDes interface module.

In the embodiment of the present disclosure, that the links A and B are faulty, and the link C is normal is taken as an example for illustration. When the links B and C are faulty, and the link A is normal, a solution for implementing interconnection fault tolerance between the first CPU and the second CPU is similar to that in this embodiment.

Embodiment 4

When the link A is faulty, and the links B and C are normal, the first control logic module sends fault information of the link A to the second FPGA through the data channel added in the first SerDes interface module, and sends a link control signal to the second FPGA, so that the second control logic module controls, through the data channel added in the second SerDes interface module, the link C to be in a reset state.

The first control logic module continues to send a link control signal to the second FPGA through the data channel added in the first SerDes interface module, so that the first control logic module controls the connection of the link A through the data channel added in the first SerDes interface module, and at the same time, the second control logic module controls the connection of the link C through the data channel added in the second SerDes interface module, thereby implementing the reestablishment of the link A.

In the embodiment of the present disclosure, that the link A is faulty, and the links B and C are normal is taken as an example for illustration. When the link C is faulty, and the links A and B are normal, a solution for implementing interconnection fault tolerance between the first CPU and the second CPU is similar to that in this embodiment.

It can be seen from the foregoing embodiments that, in implementation of interconnection architecture between interboard CPUs through a high-speed cable connection based on a transparent transmission function of the FPGA, the fault state that may exist on an interconnected link between interconnected CPUs may be well solved by using the fault tolerance solution according to the embodiment of the present disclosure, so that the faulty link is restored to a normal state in time, and a stable working state is maintained between the interconnected CPUs.

Accordingly, an embodiment of the present disclosure further provides a system for implementing interconnection fault tolerance between CPUs, and the system includes: at least a first CPU, a second CPU, a first FPGA and a second FPGA. The first CPU is connected to a first QPI interface module of the first FPGA; the second CPU is connected to a second QPI interface module of the second FPGA; a first SerDes interface module of the first FPGA is connected to a second SerDes interface module of the second FPGA, and is connected to the first QPI interface module through a first control logic module; and the second SerDes interface module of the second FPGA is connected to the second QPI interface module through a second control logic module, so as to implement the interconnection between the first CPU and the second CPU, where a data channel for transmitting link connection state information and a link control signal is added in both of the first SerDes interface module and the second SerDes interface module; and the control logic module between the corresponding QPI interface module and the SerDes interface module in the first FPGA and the second FPGA is configured to monitor a transmission link connection state between a peer FPGA and a corresponding CPU, and control a transmission link connection state between a local FPGA and a corresponding CPU.

When any connection link for implementing interconnection between the first CPU and the second CPU is faulty, the FPGA connected to the faulty link sends a link control signal to the faulty link through the data channel added in the FPGA, so as to restore the faulty link to a normal state; and when the faulty link is restored to the normal state, each FPGA respectively enables each link in the normal state connected to each FPGA, so as to connect each link for implementing interconnection between the first CPU and the second CPU.

In the foregoing system embodiment, the FPGA is disposed for the CPU, and based on a transparent transmission function of the FPGA, the interconnection between the CPUs is implemented through the connection between the FPGAs, so increase and decrease of the number of the CPUs interconnected internally may be implemented by increasing or decreasing the number of dedicated FPGAs. Therefore, the expansibility of the interconnection between the CPUs can be improved; and moreover, the data channel is added in the FPGA. When any connection link between the interconnected CPUs is faulty, the connection state information of each interconnected link of the CPUs and the link control signal are transmitted through the data channel, so as to implement the interconnection fault tolerance between the CPUs.

In a specific implementation process, when the control logic module in the first FPGA and/or the second FPGA monitors that a second connection link between the first SerDes interface module and the second SerDes interface module is faulty, the control logic module in the first FPGA and the second FPGA is configured to send a link control signal to the second connection link through respective data channel added, so as to restore the second connection link to a normal state. At the same time, the first control logic module in the first FPGA controls, through the data channel added in the first SerDes interface module, a first connection link between the first QPI interface module and the first CPU to be maintained in a reset state, and the second control logic module in the second FPGA controls, through the data channel added in the second SerDes interface module, a third connection link between the second QPI interface module and the second CPU to be maintained in the reset state. When the second connection link is restored to be normal, the first control logic module controls the connection of the first connection link through the data channel added in the first SerDes interface module; and at the same time, the second control logic module controls the connection of the third connection link through the data channel added in the second SerDes interface module.

When the first control logic module monitors that the first connection link is faulty, and the second control logic module monitors that the third connection link is faulty, the first control logic module is configured to send fault information of the first connection link to the second FPGA through the data channel added in the first SerDes interface module; and at the same time, the second control logic module sends fault information of the third connection link to the first FPGA through the data channel added in the second SerDes interface module.

The control logic module in one of the first FPGA and the second FPGA which first receives the fault information of the connection link sends a link control signal through the data channel added in the FPGA to the connection link connecting the corresponding CPU, so as to restore the connection link to a normal state; and sends a link control signal to the peer FPGA through respective data channel added in the FPGA, so as to control the control logic module of the peer FPGA to initiate a restoration operation of the connection link corresponding to the peer FPGA.

When the first (third) connection link and the second connection link are faulty, and the third (first) connection link is normal, the first (second) control logic module is configured to control, through the data channel added in the first (second) SerDes interface module, the first (third) connection link to be maintained in a reset state; and at the same time, the second (first) control logic module controls, through the data channel added in the second (first) SerDes interface module, the third (first) connection link to be maintained in the reset state. The first control logic module and the second control logic module send a link control signal to the second connection link through respective data channels added, so as to restore the second connection link to a normal state. When the second connection link is restored to be normal, the first (second) control logic module controls the connection of the first (third) connection link through the data channel added in the first (second) SerDes interface module, and at the same time, the second (first) control logic module controls the connection of the third (first) connection link through the data channel added in the second (first) SerDes interface module.

When the first (third) connection link is faulty, the first (second) control logic module is configured to send fault information of the first (third) connection link to the second (first) FPGA through the data channel added in the first (second) SerDes interface module, and send a link control signal to the second (first) FPGA, so that the second (first) control logic module controls, through the data channel added in the second (first) SerDes interface module, the third (first) connection link to be in a reset state.

The first (second) control logic module is further configured to continue to send a link control signal to the second (first) FPGA through the data channel added in the first (second) SerDes interface module, so that the first control logic module controls the connection of the first connection link through the data channel added in the first SerDes interface module, and at the same time, the second control logic module controls the connection of the third connection link through the data channel added in the second SerDes interface module.

Therefore, in the system for implementing interconnection fault tolerance between the CPUs, in implementation of interconnection architecture between interboard CPUs through a high-speed cable connection based on a transparent transmission function of the FPGA, the fault state that may exist on a interconnected link between the interconnected CPUs may be well solved by using the fault tolerance solution according to the embodiment of the present disclosure, so that the faulty link is restored to a normal state in time, and a stable working state is maintained between the interconnected CPUs.

Because the system embodiment basically corresponds to the method embodiments, the description is relatively simple, and for the relevant parts, reference may be made to part of the description in the method embodiments. The system embodiment in the foregoing description is merely exemplary. Modules described as separate components may be or may not be separated physically. Components shown as modules may be or may not be physical modules, that is, may be integrated or distributed to a plurality of network modules. Some or all of the modules may be selected to achieve the objective of the solution of the embodiment according to actual demands. Persons of ordinary skill in the art may understand and implement the present disclosure without creative efforts.

Based on the description of the disclosed embodiments, persons skilled in the art can implement or apply the present disclosure. Various modifications of the embodiments are apparent to persons skilled in the art, and general principles defined herein may be implemented in other embodiments without departing from the spirit or scope of the present disclosure. Therefore, the embodiments of present disclosure are not limited to the embodiments shown herein, but intend to cover the widest scope consistent with the principle and the novel features disclosed in the specification.

What is claimed is:
1. A computer system for implementing fault tolerance, comprising:
  a first CPU;
  a second CPU;
  a first CPU interconnect device that comprises a first quick path interconnect (QPI) interface and a first serial deserial (SerDes) interface that are connected to each other; and
  a second CPU interconnect device that comprises a second QPI interface and a second SerDes interface that are connected to each other;
  wherein:
    the first CPU and the second CPU implement interconnection through a first connection link, a second connection link and a third connection link;
    the first connection link is established between a QPI interface of the first CPU and the first QPI interface to transmit data sent or received by the first CPU;
    the third connection link is established between a QPI interface of the second CPU and the second QPI interface to transmit data sent or received by the second CPU;
    the second connection link is established between the first SerDes interface and the second SerDes interface to transmit data between the first CPU and the second CPU;
    a fourth data channel is additionally established between the first SerDes interface and the second SerDes interface, the fourth data channel is configured to transmit a link state and a link control signal;
  wherein the computer system is configured to monitor the link state of any one of the first connection link, the second connection link and the third connection link, transmit the link state through the fourth data channel between the first CPU interconnect device and the second CPU interconnect device, recover any one of the connection links when determining whether any one of the first connection link, the second connection link and the third connection link is faulty.

2. The system according to claim 1, wherein:
the first CPU interconnect device comprises a first control logic module; and
the second CPU interconnect device comprises a second control logic module;
wherein the first control logic module is configured to monitor the link state of the first connection link and the second connection link, send the link state of the first connection link to the second control logic module through the fourth data channel, receive the link state of the third connection link through the fourth data channel, recover a faulty connection link when determining whether any one of the first connection link and the second connection link is faulty or when receiving a link control signal from a peer control logic module through the fourth data channel;
wherein the second control logic module is configured to monitor the link state of the third connection link and the second connection link, send the link state of the third connection link to the first control logic module through the fourth data channel, receive the link state of the first connection link through the fourth data channel, recover a faulty connection link when determining whether any one of the third connection link and the second connection link is faulty or when receiving a link control signal from a peer control logic module through the fourth data channel.

3. The system according to claim 2, wherein when the second connection link is faulty,
the first control logic module is configured to recover the second connection link, maintain the first connection link in a reset state while recovering the third connection link, and control a QPI initialization process of the first connection link to recover the first connection link after recovering the second connection link; and the second control logic module is configured to recover the second connection link, maintain the third connection link in a reset state while recovering the second connection link, and control a QPI initialization process of the third connection link to recover the third connection link after recovering the second connection link.

4. The system according to claim 3, wherein both the first control logic module and the second control logic module are configured to exchange a link control operation signal mutually so that both the first connection link and the third connection link enter the QPI initialization process at a same time.

5. The system according to claim 1, when the second connection link is operational and both the first connection link and the third connection link are faulty, the first control logic module is configured to transmit state information of the first connection link to the second control logic module through the fourth data channel, and the second control logic module is configured to transmit state information of the second connection link to the first control logic module through the fourth data channel;

a control logic module of the first and the second control logic modules that is first to receive link state information transmitted by the other control logic module is configured to control a QPI initialization process to recover a connection link in a native node, and send a link control signal to the other control logic module through the fourth data channel;

wherein the other control logic module is configured to control another QPI initialization process to recover a connection link in a native node according to the link control signal.

6. The system according to claim 5, wherein both the first control logic module and the second control logic module are configured to exchange a link control operation signal mutually so that both the first connection link and the third connection link enter the QPI initialization process at a same time.

7. The system according to claim 2, wherein when the second connection link is operational, and any one of the first connection link and the third connection link are faulty, a control logic module of the first and the second control logic modules that determines that a native connection link is faulty is configured to control a QPI initialization process to recover a connection link in a native node, transmit state information of the native connection link to the other control logic module through the fourth data channel, and send a link control signal to the other control logic module through the fourth data channel;

wherein the other control logic module is configured to control another QPI initialization process to recover a connection link in a native node according to the link control signal.

8. The system according to claim 7, wherein both the first control logic module and the second control logic module are configured to exchange a link control operation signal mutually so that both the first connection link and the third connection link enter the QPI initialization process at a same time.

9. A method for implementing fault tolerance in a system, providing a system that comprises a first CPU, a second CPU, a first CPU interconnect device, and a second CPU interconnect device, wherein the first CPU interconnect device comprises a first quick path interconnect (QPI) interface and a first serial deserial (SerDes) interface that are connected to each other, the second CPU interconnect device comprises a second QPI interface and a second SerDes interface that are connected to each other, wherein the first CPU and the second CPU implement an interconnection through a first connection link, a second connection link and a third connection link;

the first connection link is established between a QPI interface of the first CPU and the first QPI interface to transmit data sent or received by the first CPU;

the third connection link is established between a QPI interface of the second CPU and the second QPI interface to transmit data sent or received by the second CPU;

the second connection link is established between the first SerDes interface and the second SerDes interface to transmit data between the first CPU and the second CPU;

wherein a fourth data channel is additionally established between the first SerDes interface and the second SerDes interface, the fourth data channel is configured to transmit link state and a link control signal, monitoring a link state of any one of the first connection link, the second connection link and the third connection link;

transmitting a link state through the fourth data channel between the first CPU interconnect device and the second CPU interconnect device; and recovering any faulty connection links when determining whether any one of the first connection link, the second connection link and the third connection link is faulty.

10. The method according to claim 9, wherein the first CPU interconnect device comprises a first control logic module, the second CPU interconnect device comprises a second control logic module, and wherein when the second connection link is faulty, the method comprises:

recovering, by the first control logic module, the second connection link;

maintaining, by the first control logic module, the first connection link in a reset state while recovering the third connection link;

controlling, by the first control logic module, a QPI initialization process of the first connection link to recover the first connection link after recovering the second connection link;

recovering, by the second control logic module, the second connection link, maintaining, by the second control logic module, the third connection link in a reset state while recovering the second connection link; and controlling, by the second control logic module, a QPI initialization process of the third connection link to recover the third connection link after recovering the second connection link.

11. The method according to claim 10, further comprising:

exchanging, by both the first control logic module and the second control logic module, a link control operation signal mutually so that both the first connection link and the third connection link enter the QPI initialization process at a same time.

12. The method according to claim 9, when the second connection link is operational and both the first connection link and the third connection link are faulty, the method further comprises:

transmitting, by the first control logic module, state information of the first connection link to the second control logic module through the fourth data channel;
transmitting, by the second control logic module, state information of the second connection link to the first control logic module through the fourth data channel;
controlling, by one of the first and the second control logic modules, which is first to receive link state information transmitted by the other control logic module, a QPI initialization process to recover a connection link in native node;
sending a link control signal to the other control logic module through the fourth data channel;
controlling, by the other control logic module, another QPI initialization process to recover a connection link in a native node according to the link control signal.

13. The method according to claim 12, further comprising:
exchanging, by both the first control logic module and the second control logic module, a link control operation signal mutually so that both the first connection link and the third connection link enters the QPI initialization process at a same time.

14. The method according to claim 9, wherein when the second connection link is operational, and any one of the first connection link and the third connection link is faulty, the method further comprises:
controlling, by one of the first and the second control logic modules that determines whether a native connection link is faulty, a QPI initialization process to recover a connection link in a native node,
transmitting state information of the native connection link to the other control logic module through the fourth data channel;
sending a link control signal to the other control logic module through the fourth data channel; and
controlling, by the other control logic module, another QPI initialization process to recover a connection link in a native node according to the link control signal.

* * * * *